May 15, 1956  M. F. CHUBB ET AL  2,745,892
METHOD OF DISCHARGING ELECTROLYTIC CELLS
Filed Jan. 26, 1952
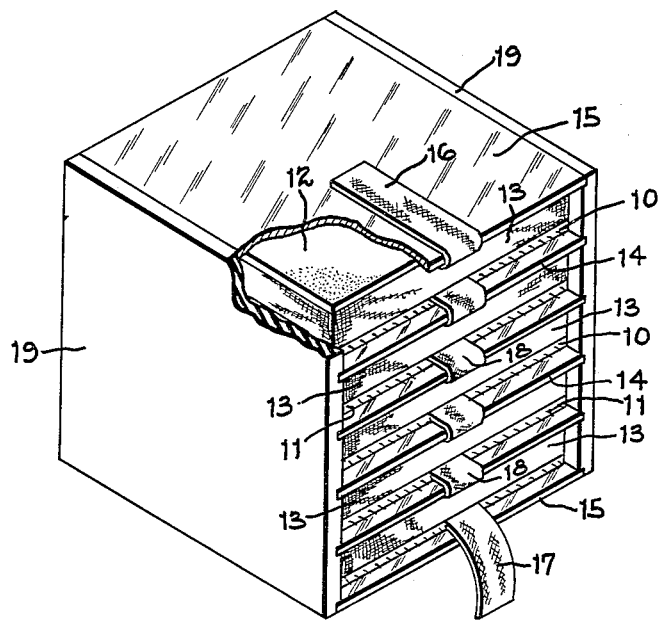
INVENTORS.
Melvin F. Chubb.
BY James M. Llines.
Wood, Herron & Evans.
ATTORNEYS.

United States Patent Office 2,745,892
Patented May 15, 1956

2,745,892
METHOD OF DISCHARGING ELECTROLYTIC CELLS

Melvin F. Chubb and James M. Dines, Joplin, Mo., assignors of The Eagle-Picher Company, Cincinnati, Ohio, a corporation of Ohio Application January 25, 1952, Serial No. 268,422

4 Claims. (Cl. 136—90)

This invention relates to a method of activating and discharging electrolytic cells and primary batteries which utilize cuprous chloride as the active chemical of the positive electrode. The negative electrodes of batteries of this type are usually constituted by magnesium or zinc or equivalent chemically active electronegative metals and, in general, water or an aqueous salt solution is used as the electrolyte. Batteries of this type are customarily fabricated and stored dry, the electrolyte being added just prior to use. After a cuprous chloride battery of this type has been activated, for instance by being dunked in water, it is necessary to discharge the battery fully within a fairly short period of time for the reason that the spongy cuprous chloride positive electrode disintegrates in the presence of the electrolyte at a relatively rapid rate, that is, over a period of several hours, so that if the current is not drawn from the battery during this period, the active chemical of the positive is wasted in part or in whole.

The primary object of this invention is to provide a method of activating and discharging batteries of this type whereby the latency period is extended or prolonged, i. e., the time lapse between activation by introduction of electrolyte and the time when it becomes necessary to close the circuit if useless deterioration of the cuprous chloride is to be avoided is appreciably lengthened. In other words, ordinary cuprous chloride batteries must be put in closed circuit operation within a period of from one to three hours after introduction of the electrolyte if the active chemicals are not to be wasted, whereas the method of this invention permits discharge to be deferred for a period of from six to twelve hours without substantial sacrifice of the inherent current generating capacity of the battery.

Furthermore, the type of cuprous chloride battery which is in current practical use is a cuprous chloride battery for airborne equipment which includes a pasted cuprous chloride positive electrode, a sheet magnesium negative electrode and a pad of bibulous material which holds a limited amount of water or active electrolyte in contact with the opposing surfaces of the electrodes. Such cells or batteries are particularly adapted to be discharged at a high rate and tend to generate substantial heat during such discharge. This heat tends to boil off the aqueous electrolyte, that is, to dry out the bibulous pad so that the battery ceases to give current prior to the time when the active chemicals of the electrodes are actually exhausted.

This is particularly true where the battery is constituted by a series of thin waferlike cells which are connected in series and which utilize the principle of holding the electrolyte upon a bibulous or absorbent membrane or pad between the two electrodes. In such a case, the quantity of available electrolyte is limited and, further, the interior cells are effectively thermally insulated by the end or exterior cells.

A second object of this invention is to provide a method of discharging a battery of the type specified whereby the electrolyte is not evaporated under closed circuit conditions and the battery discharges to the full capacity of the active chemicals which constitute the cell electrodes.

The nature of our invention will be better understood in relation to the accompanying drawing in which the figure is a perspective view of the primary battery which may be discharged according to the methods of this invention.

In the drawing, a series of positive electrodes are constituted by masses of cuprous chloride 10 affixed to screen grids 11. As disclosed, the negative electrodes are constituted by magnesium sheets 12, although pasted zinc electrodes or the like may also be used. Between these platelike positive and negative electrodes of each cell is a bibulous pad or membrane 13 which holds the electrolyte in physical contact with the face of each electrode and also serves as an electrode separator. Between each two cells is a cell partition 14 which is fabricated from plastic sheet material. At each end of the battery is a seet plastic end plate 15. Connecters 16 and 17 are attached to the terminal electrodes adjacent to the end plates and the intermediate electrodes are connected, positive to negative, by connecters 18 which pass over the tops of the cell partitions. These elements are arranged in a stack to constitute a series of thin waferlike cells and are held together by means of plastic cement 19 which secures the end plates and cell partitions at each side of the battery. The composition of the sheet plastic and plastic cement may be of any desired nature, provided the cement bonds to the sheet plastic as disclosed in our co-pending applications, Serial No. 311,687, filed September 26, 1952, entitled Battery Construction and Method or the constructions of the co-pending applications of Melvin F. Chubb, Serial No. 172,558, filed July 7, 1950, entitled "Electric Battery," now Patent No. 2,684,395 and Serial No. 181,248, filed August 24, 1950, entitled "Method of Making Electric Batteries," now Patent No. 2,684,481.

While the method of our inventions may be used with any type of cuprous chloride battery, the disclosure is made in relation to the stack of waferlike cells for the reason that batteries of this type are at present being manufactured in quantity production and, further, this type of physical construction accentuates one of the problems of electrolytic evaporation which this invention solves.

In using batteries of the cuprous chloride type, it is often inconvenient to activate the battery by dipping it or dunking it in electrolyte an almost precise period of time in advance of the intended closing of the circuit of the battery. Otherwise the positive electrode deteriorates physically even with the circuit open. In the past, batteries of this type have permitted little leeway as to interval between activation and usage. In general, it has been necessary to commence the closed circuit usage of the battery within fifteen minutes to an hour of the time of activation in order to avoid this waste of the cuprous chloride of the positive electrodes. We have found that this period is substantially increased if 5 to 50 per cent polar solvent is mixed with the aqueous electrolyte. Apparently, the cuprous chloride does not disintegrate (by hydration and/or dissolution) in the aqueous glycerin solution as rapidly as it does in plain water or water containing an activating salt such as sodium chloride, yet after activation, the battery delivers substantially as much current with the glycerin in the electrolyte as it would otherwise with a plain aqueous or aqueous saline.

If our invention is utilized, it is possible to activate a cuprous chloride battery with a solution of aqueous glycerin then defer usage of the battery for as much as six to twelve hours without any substantial sacrifice of the ultimate power or current delivery of the battery.

Hence, this method of activating and discharging the battery materially increases the convenience of the user and, hence, the overall utility and value of the battery.

The use of 5 to 50 per cent glycerin in the aqueous electrolyte also solves the problem of overheating of cuprous chloride magnesium cells. Apparently this overheating is due to the evolution of heat which attends hydration of the magnesium chloride which is formed as the battery discharges. Without the glycerin, the cell will boil the electrolyte from the bibulous pad between the cell electrodes, if the cell is discharged at a high rate. With the glycerin in the electrolyte, hydration of the magnesium chloride is apparently retarded so that, despite the fact that the delivery of the current is substantially equivalent to the delivery of current to the plain aqueous electrolyte, the evolution of heat is conspicuously less. Hence, the limited supply of electrolyte which may be held on a bibulous pad is conserved and the battery discharges to the full capacity of the active chemicals which constitute the electrodes.

In this cell discharging operation, the glycerin modifies and lessens the tendency of the water to dissolve the cuprous chloride of the positive electrode and modifies and lessens the tendency of the magnesium chloride which is formed at the negative electrode to hydrate and overheat. It follows that other chemicals with solvency characteristics similar to glycerin may be substituted for it. These chemicals, generally speaking, are classified as polar solvents which are water miscible and which are substantially neutral chemically in the sense that they do not exhibit strong basic or acidic tendencies, i. e., they are relatively ionically inactive. Also, it is preferable that the polar solvents have a boiling point above the boiling point of water. The polar solvents which inhibit chloride solution or hydration include the normal glycerin substitutes such as ethylene glycol, diethylene glycol, propylene glycol, dipropylene glycol and the alcohols and ethers which are normally classified as water miscible polar solvents.

The amount of glycerin used in the electrolyte may vary from 5 to 50 percent on a weight basis, but a range of 15 to 25 percent is preferable and 20 percent is considered optimum for use in a cell which utilizes magnesium negative electrodes. The glycerin substitutes, i. e., polar solvents, may be used in substantially the same general range, the exact optimum percentage varying with the nature of the substituted chemical and the precise characteristics of the battery being activated.

From the point of view of operating airborne equipment, the utilization of the present invention provides substantial advantages. In the first place, the incorporation of glycerin, or its chemical equivalent, in the electrolyte raises its boiling point and lowers its freezing point which retards the drying out of the bibulous pad during discharge and tends to prevent freezing of the electrolyte prior to initiation of discharge. Further as explained, the use of the invention prolongs the latency period during which the cuprous chloride and, particularly, a pasted cuprous chloride electrode may be exposed to the aqueous electrode without wasteful disintegration and, further, reduces generation of heat during discharge by retarding the rate of exothermic hydration of the magnesium chloride which is formed during the discharge. By utilizing this invention, it is practical to use very light, efficient pasted cuprous chloride magnesium electrodes with non-spill bibulous pads as the cells of primary batteries on air borne equipment and to have assurance of the expected performance of such batteries over a wide range of operating circumstances and conditions without danger of battery failure resulting from minor deviation of actual conditions from those expected.

Having described our invention, we desire to be limited only by the following claims:

1. An improved method of activating an electrolytic cell having a pasted cuprous chloride positive electrode, a sheet magnesium negative electrode and a bibulous pad between the electrodes in order to reduce the rate of decomposition of the cuprous chloride of the positive electrode and to prevent overheating of the cell, said method comprising saturating the bibulous pad of the cell with an aqueous electrolyte which contains substantially 5 to 50% glycerin, whereby the solubility of the cuprous chloride in the electrolyte is reduced and the exothermic hydration of the magnesium chloride which is formed by decomposition of the negative electrode is retarded.

2. An improved method of activating an electrolytic cell having a pasted cuprous chloride positive electrode, a sheet magnesium negative electrode and a bibulous pad between the electrodes in order to reduce the rate of decomposition of the cuprous chloride of the positive electrode and to prevent overheating of the cell, said method comprising saturating the bibulous pad of the cell with an aqueous electrolyte which contains substantially 5 to 50% water miscible polar solvent of the class consisting of glycerin, ethylene glycol, diethylene glycol, propylene glycol, and dipropylene glycol, whereby the solubility of the cuprous chloride in the electrolyte is reduced and the exothermic hydration of the magnesium chloride which is formed by decomposition of the negative electrode is retarded.

3. An improved method of activating an electrolytic cell having a pasted cuprous chloride positive electrode, a sheet magnesium negative electrode and a bibulous pad between the electrodes in order to reduce the rate of decomposition of the cuprous chloride of the positive electrode and to prevent overheating of the cell, said method comprising saturating the bibulous pad of the cell with an aqueous electrolyte which contains substantially 15 to 25% glycerin, whereby the solubility of the cuprous chloride in the electrolyte is reduced and the exothermic hydration of the magnesium chloride which is formed by decomposition of the negative electrode is retarded.

4. An improved method of activating an electrolytic cell having a pasted cuprous chloride positive electrode, a sheet magnesium negative electrode and a bibulous pad between the electrodes in order to reduce the rate of decomposition of the cuprous chloride of the positive electrode and to prevent overheating of the cell, said method comprising saturating the bibulous pad of the cell with an aqueous electrolyte which contains substantially 15 to 25% water miscible polar solvent of the class consisting of glycerin, ethylene glycol, diethylene glycol, propylene glycol, and dipropylene glycol, whereby the solubility of the cuprous chloride in the electrolyte is reduced and the exothermic hydration of the magnesium chloride which is formed by decomposition of the negative electrode is retarded.

References Cited in the file of this patent

UNITED STATES PATENTS

| Number | Name | Date |
|---|---|---|
| 350,294 | Cox | Oct. 5, 1886 |
| 395,706 | Kitsee | Jan. 8, 1889 |
| 1,140,826 | Hoppie | May 25, 1915 |
| 1,920,151 | Ruben | July 25, 1933 |
| 2,040,255 | Gordon | May 12, 1936 |
| 2,050,173 | Gordon | Aug. 4, 1936 |
| 2,322,210 | Adams | June 22, 1943 |
| 2,428,850 | Lawson | Oct. 14, 1947 |
| 2,564,495 | Mullen | Aug. 14, 1951 |
| 2,636,060 | Fischbach et al. | Apr. 21, 1953 |
| 2,639,306 | Fischbach | May 19, 1953 |
| 2,640,091 | Pucher et al. | May 26, 1953 |
| 2,640,863 | Ellis | June 2, 1953 |